United States Patent [19]
Hirmann

[11] 3,855,709
[45] Dec. 24, 1974

[54] METHOD AND APPARATUS FOR MEASURING CHASSIS GEOMETRY

[75] Inventor: Georg Hirmann, Zurich, Switzerland

[73] Assignee: Polyprodukte, AG, Zurich, Switzerland

[22] Filed: Oct. 10, 1972

[21] Appl. No.: 296,151

[52] U.S. Cl.............. 33/203.15, 33/203, 33/125 C
[51] Int. Cl. ............................................ G01b 5/24
[58] Field of Search........ 33/203.12, 203.17, 125 C, 33/203.15, 203

[56] References Cited
UNITED STATES PATENTS

| | | | |
|---|---|---|---|
| 3,001,081 | 9/1961 | Bower | 33/125 C X |
| 3,170,100 | 2/1965 | Rantsch et al. | 33/125 C X |
| 3,417,479 | 12/1968 | Hirmann | 33/203.17 |
| 3,546,782 | 12/1970 | Pereue et al. | 33/203.17 |

*Primary Examiner*—William D. Martin, Jr.
*Attorney, Agent, or Firm*—Craig & Antonelli

[57] ABSTRACT

An apparatus for measuring the chassis geometry including the toe-in and camber of individual vehicle wheels. Instead of aligning either the vehicle or the measuring installation, the relative inclined position of the symmetrical axis of the vehicle is measured by means of four fixedly mounted scanning devices adapted for application to the single vehicle wheels. At the same time a correcting factor of the inclined position is automatically calculated in a digital manner and considered as a zero-point correction for the measurement of the angular inclination of each of the wheels.

24 Claims, 5 Drawing Figures

METHOD AND APPARATUS FOR MEASURING CHASSIS GEOMETRY

BACKGROUND AND SUMMARY OF THE INVENTION

The present invention relates to an apparatus for measuring vehicle chassis geometry and especially for measuring the angles of wheel inclination of motor vehicle wheels.

The correct measurement of the angular inclination of wheels on vehicles, especially on automobiles is only possible, if such measurement and, in particular, the measurement of the toe-in, is effected in relation to the symmetrical axis of the chassis; that is, the symmetrical axis of the chassis must be in agreement with the symmetrical axis of the measuring apparatus or run parallel thereto.

In prior arrangements, correct values were obtained by aligning either the vehicle along the measuring installation or by aligning such installation in relation to the vehicle. Both of these aligning arrangements require a lot of time, of manual work and cumbersome operations.

In the arrangements contemplated by the present invention it will no longer be necessary to change the position of the vehicle or of the measuring installation. According to the present invention, the relative inclination of the symmetrical axis of the chassis is measured by means of four fixedly mounted scanning devices adapted for application to each respective single wheel, whereupon a correcting factor of axle inclination is automatically determined and considered in the measurement of wheel inclinations. The measuring and calculating system of the present invention works in a digital manner and preferably by the incremental measuring method.

It is contemplated by the present invention that the paths of application of four two-dimensional scanning devices adapted for application to the wheel planes of the respective wheels and held in fixedly mounted guiding elements are measured in an individual and digital manner. It is further contemplated by the present invention to utilize the measured value for these paths to calculate automatically the inclined position of the chassis and to proceed to a measurement of the wheel inclination in relation to the symmetrical axis, thus making it unnecessary to align the vehicle in relation to the symmetrical axis of the measuring apparatus.

According to the present invention, the paths of application of the scanning devices and the angles of inclination of the vehicle wheels are preferably measured by an incremental method. According to the preferred embodiment of the present invention, the arrangement is such that the measurements are taken by means of four fixedly arranged measuring blocks and by means of measuring heads with feeler pins fitted on said measuring blocks which are electrically connected through wires to a counting and indicating device.

According to a further aspect of the present invention, measuring discs fixed to the vehicle wheels and aligned along the geometrical wheel planes may be used for exactly representing the geometrical wheel planes. The measuring heads are conveniently secured to push rods of the measuring blocks and carry feeler pins arranged in consecutive relationship, one being fixed, one being movable and placed horizontally in relation to the fixedly arranged pin and one being movable and arranged in a vertical position with respect to the fixed pin.

In a preferred embodiment of the present invention, the movable feeler pins are connected with an incremental cam adapted for transformation into countable pulses. Stepping motors, the movements of which are summed up by means of differential gears, are also used in a preferred embodiment for counting and storing the impulses.

According to further features of preferred embodiments of the present invention, the determination of the symmetrical axis of the chassis may be effected in such a manner that for the front and rear wheels of the vehicle there are provided a pair each of cooperating measuring blocks with push rods carrying incremental cams, said cams moving past photoelectric cells which produce impulses and pass these impulses on to stepping motors, of which two motors act on a respective common differential gear. For measuring the angular inclination of the vehicle wheels, there are conveniently used measuring heads having feeler pins for application to measuring discs, said incremental cams connected with the feeler pins producing impulses in photoelectric cells for the purpose of operating stepping motors. The measurement of the toe-in may be effected in such a manner that the correcting value for the symmetrical axis of the chassis, said value being stored by a stepping motor, and the value of the toe-in feeler pins stored in another stepping motor are summed up by means of a differential gear. Upon measurement of the camber the value transmitted by the camber feeler pins to a stepping motor may be read from the position of the stepping motor. For exact transmission of the rotational movements there are also used, by way of example, racks serving also for scale indications.

In addition, it is contemplated by the present inventor to provide the rack with a printing unit printing the scale readings onto a check chart.

These and other objects, features, and advantages of the present invention will become more apparent from the following description thereof, when taken in connection with the accompaning drawings, wherein several embodiments are shown.

DETAILED DESCRIPTION OF THE DRAWINGS

Figure 1:
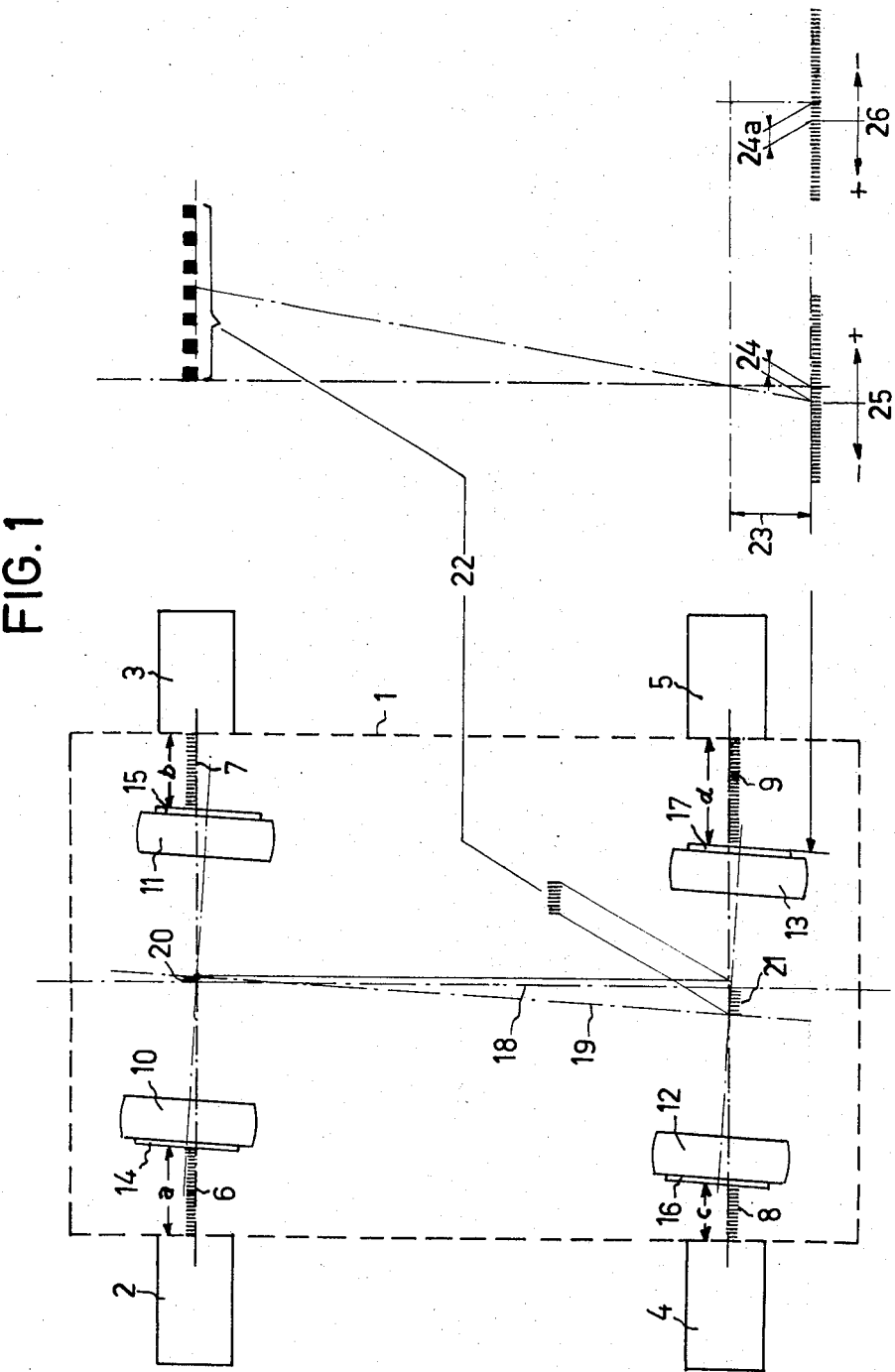
FIG. 1 is a schematic representation of the measuring apparatus according to the present invention.

FIG. 1 shows a measuring place 1 onto which the vehicle is positioned and adjacent to which there are arranged the measuring blocks 2 – 5 for measuring the inclinations of the respective vehicle wheels. Push rods 6 – 9 may be advanced from the respective individual measuring blocks 2 – 5 towards the respective vehicle wheels 10 – 13, until the ends of the push rods abut against the respective measuring discs 14 – 17 connected to the wheels. Before operating the push rods, the measuring discs are adjusted to the exact geometrical wheel plane of each of the respective wheels.

Initially it is necessary to determine the exact position of the longitudinal center axis 19 of the vehicle, said axis being angularly displaced in relation to the longitudinal center axis 18. Notches are provided on the push rods 6 – 9, the length of which rods being respectively designed as $a$, $b$, $c$, $d$. The difference between the distances $a$ and $b$ provides as a result the angular displacement 20 of the center of the rear axle of wheels 10, 11 from the longitudinal center axis 18 of the measuring apparatus. In the same manner, the difference between the distances $c$ and $d$ provides as a result the angular displacement 21 of the center of the front axle of wheels 12, 13, but in this case in relation to the opposite side of the longitudinal center axis 18 of the measuring apparatus. The longitudinal center axis 17 of the vehicle is determined by the connecting line of the two axle centers. Instead of measuring the distances $a$, $b$, $c$ and $d$, the latter may also be determined by counting out the notch units in the respective rods 6 – 9, a method which is known as incremental mode of counting. The counting of these incremental units is effected automatically by means of the devices described below.

Instead of calculating the difference, the inclination of the longitudinal center axis 19 of the vehicle in relation to the axis 18 may also be deduced from the formula $(a+d) - (b+c)$. As a result of the present position of the vehicle illustrated in FIG. 1, there is provided, according to the afore-mentioned formula, an inclination factor 22 represented in terms of incremental units. This value 22 represents a correcting factor which must be considered in the measurement of the angle of inclination of the vehicle wheels.

The angles of inclination of the individual vehicle wheels, known as toe-in and camber, are measured by means of measuring heads fitted to the ends of the push rods. Each of the measuring heads contains a fixed and a displaceable feeler pin. The feeler pin carries an incremental notch unit so that the displacement thereof can be determined by incremental counting. The notches of the feeler pins are considerably smaller than the notches of the push rods, the relationship corresponding to the relation between feeler distance 23 and distance of axial centers.

The toe-in values for the vehicle wheels 12, 13 of the front axle may be read on the right hand side and left hand side of notches 25 and 26 respectively, the correcting factor 22 being considered in the measurement as zero-point displacement 24 and 24a, respectively. That is, correcting factor 22 effectively shifts the zero points 25 and 26 on the toe-in read out scale to compensate for the angular orientation of vehicle axis 19 with respect to central axis 18 of the measuring installation.

Figure 2:
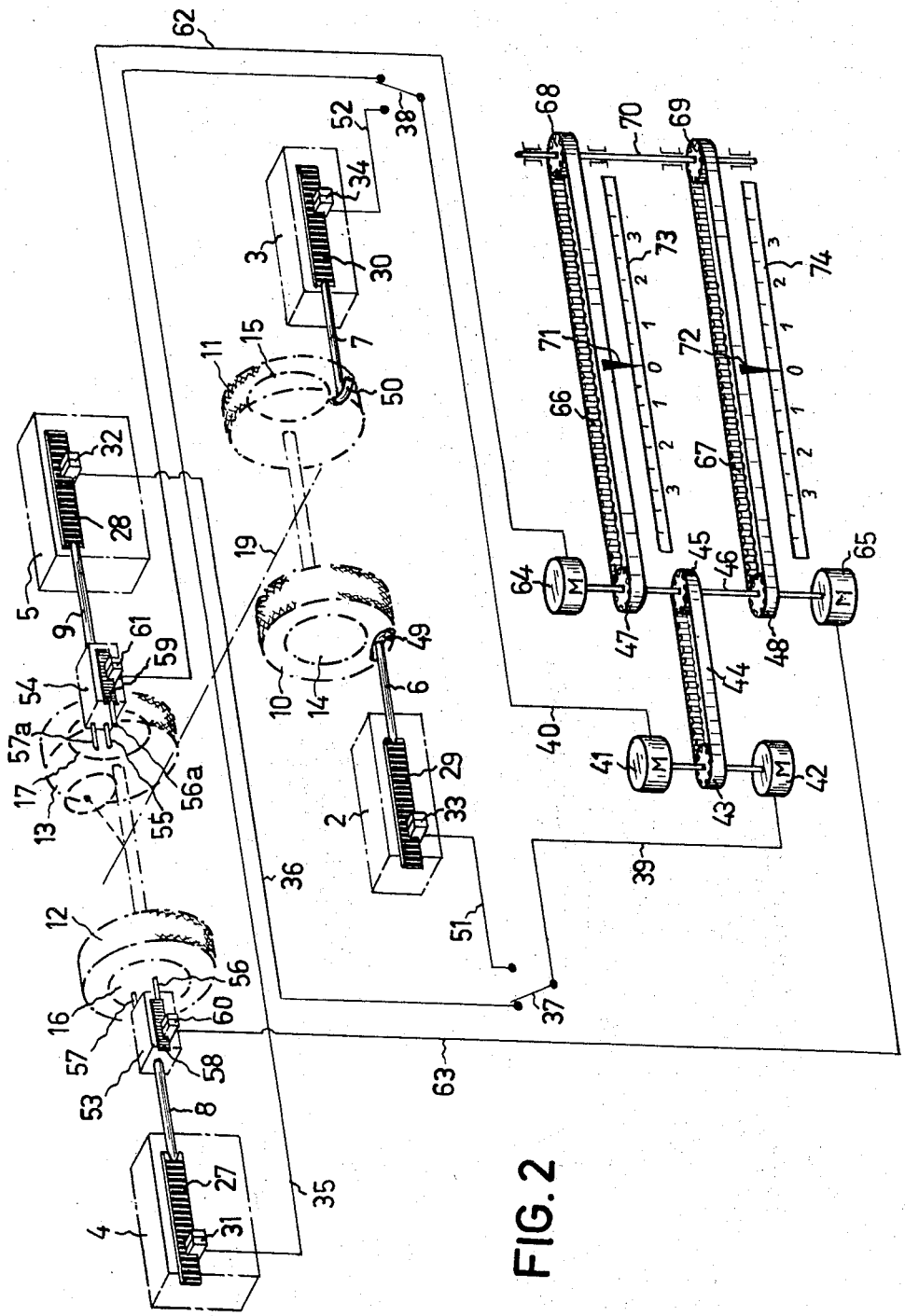
FIG. 2 is a schematic perspective view of a one-axle measuring installation according to the present invention.

FIG. 2 shows a physical embodiment of a one-axle measuring installation. It is intended to measure the toe-in of the vehicle wheels 12, 13 on the front axle. The four wheels 10 – 13 are positioned opposite the respective measuring blocks 2 – 5 and the corresponding respective push rods 6 – 9 carrying notches 27 – 30. As the push rods are applied to the measuring discs 14 – 17, the notches move past respective photoelectric cells 31 – 34 transforming the notch units into impulses and transmitting said impulses via conductors 35, 36, switches 37, 38 and via conductors 39, 40 to the stepping motors 41, 42. The stepping motors 41 and 42 transform the impulses into motional steps and operate the side wheels of a common differential gear 43. Each of the photoelectric cells contains separate elements for advancing and returning movement of the notches and thereby produce a corresponding sense of rotation of the stepping motors, considering thus the angular displacement of the front axle center. The switches 37, 38 are now shifted to the switch position and thus connected to the photoelectric cells 33, 34 of blocks 2, 3. The impulses are transmitted via conductors 51, 52, switches 37, 38 and conductors 39, 40 once again to the stepping motors 41, 42 and operate these motors. In this manner, the correcting factor of the position of the longitudinal center axis of the vehicle has been duly considered. That is, the stepping motors automatically effect a shift of the read out corresponding to the correcting factor 22 discussed above with respect to FIG. 1. In this connection, cell 33 supplies a signal to motor 42 corresponding to distance $a$ and cell 32 supplies a signal to motor 42 corresponding to distance $d$, while cell 30 supplies a signal corresponding to distance $b$ to motor 41 and cell 31 supplies a signal to motor 41 corresponding to distance $c$, whereby differential gear 43 is adjusted to automatically account for the angular orientation of the vehicle. The scales associated with pointers 71 and 72 are appropriately marked with plus and minus signs, as shown for example in FIG. 3.

Whereas the ends of the push rods 6, 7 are provided with fixed feelers 49, 50, the stationary feeler pins 55 of the measuring heads 53, 54 fitted to the ends of the push rods, serve the same purpose on the push rods 8, 9. In addition to the stationary feeler pins 55 the horizontally arranged displaceable feeler pins 56, 56a become also operative for the measurement of the toe-in. These latter pins have notches 58, 59 moving past photoelectric cells 60, 61. Upon movement of the feeler pins 56, 56a, the photoelectric cells 60, 61 transmit impulses via conductors 62, 63 to the stepping motors 64, 65.

Feeding-in of the correcting factor is effected by means of a rack 44 from the outer wheel of the differential gear 43 to a driving wheel 45 transmitting its movement via shaft 46 to the differential gears 47, 48, each of which is connected with the stepping motors 64, 65, respectively. The outgoing wheels of the differential gears 47, 48 now contain the correct toe-in values and indicate these values on scales 73, 74 by means of hands 71, 72. The indicating device uses racks 66, 67 supported by the outgoing wheels of the differential gears 47, 48 and by wheels 68, 69 mounted on a shaft 70. The hands 71, 72 indicating the position of the differential gears are arranged on the racks.

Figure 3:
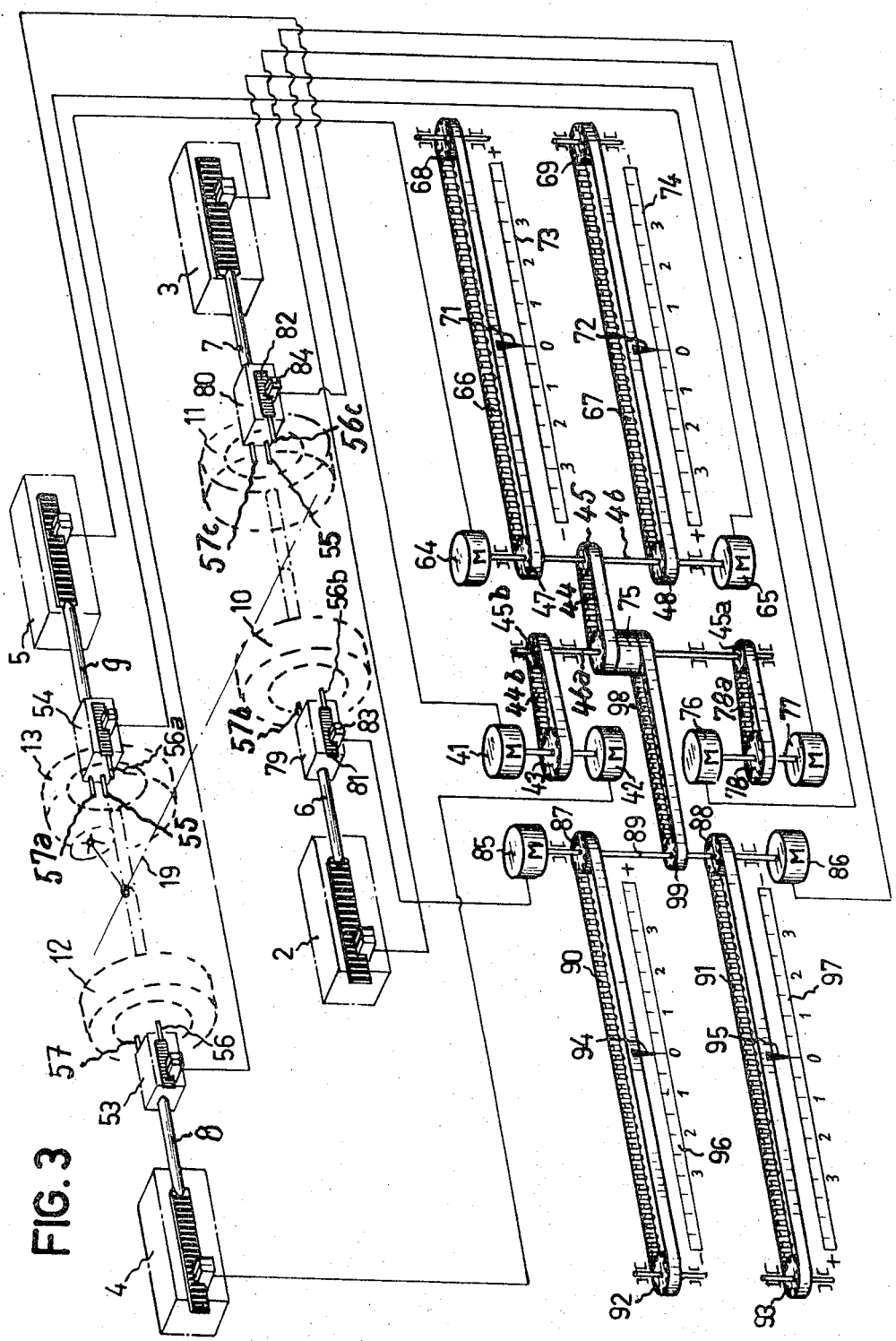
FIG. 3 is a schematic perspective view of a two-axle measuring installation for simultaneous determination of the angular inclination on the four vehicle wheels according to the present invention.

The arrangement according to FIG. 3 permits the simultaneous measurement of the toe-in of the four vehicle wheels 10 – 13. The measuring blocks 2 – 5 are provided with measuring heads 53, 54, 79, 80, said heads having each a stationary feeler pin 55 and a displaceable feeler pin 56, 56a, 56b, 56c, all being arranged in the same horizontal plane.

In relation to the vehicle wheels 12, 13 the circuit diagram is in agreement with that shown for the one axle measuring installation according to FIG. 2, the switches 37, 38, however, being omitted. A similar circuit diagram is provided for the vehicle wheels 10, 11.

The impulses produced by the photoelectric cells are transmitted from the measuring blocks 2, 3 to the stepping motors 76, 77 acting on the common differential gear 78. The outer gear wheel is connected through a rack 78a with the driving wheel 45a of half-shaft 46a. The gear ratio produced in this manner is 1:2 in order to balance the gear reduction occasioned by the differential gear.

The stepping motors 41, 42 which receive their impulses from the measuring blocks 4, 5 and which are connected with the shaft through the differential gear 43, rack 44b and through the driving wheel 45b, act on the other half-shaft 46a. The differential gear 75 parts the shaft 46, whereby the side wheels of the gear are connected on one side with the half-shaft 46 through rack 44 and driving wheel 45 to consider the toe-in values of the measuring heads 53, 54, and, on the other side, with a driving wheel 99 of the half-shaft 89 through a rack 98 to consider the toe-in values of the measuring head 79, 80. The measuring heads 79, 80 have displaceable feeler pins 56b, 56c with notches 81, 82 which, as they move past, produce impulses in photoelectric cells 83, 84. The impulses operate stepping motors 85, 86 acting each on differential gears 87, 88 which, at the same time, receive the movement of driving wheel 99. It will be understood that, with the arrangement of FIG. 3, impulses corresponding to distances a, b, c, d of FIG. 1 are fed respectively to stepping motors 76, 77, 41 and 42, whereby the angular orientation of the vehicle is automatically accounted for.

The outer wheels of the differential gears 87, 88 contain the exact toe-in values of the vehicle wheels 10, 11 and transmit these values to the indicating device by means of racks 90, 91 supported by driving wheels 92, 93. The pointers 94, 95 of the racks 90, 91 indicate the measured value on scales 96, 97.

For the measurement of the camber of the vehicle wheels the position of the vehicle need not be taken into consideration. Measurement of camber is effected on the front axle by means of the measuring heads 53, 54 and by means of the measuring heads 79, 80 on the wheels of the rear axle respectively (see FIG. 3). The camber is measured by using the stationary feeler pins 55 and the displaceable feeler pins 57, 57a, 57b, 57c arranged in the vertical plane of feeler pins 55.

Figure 4:
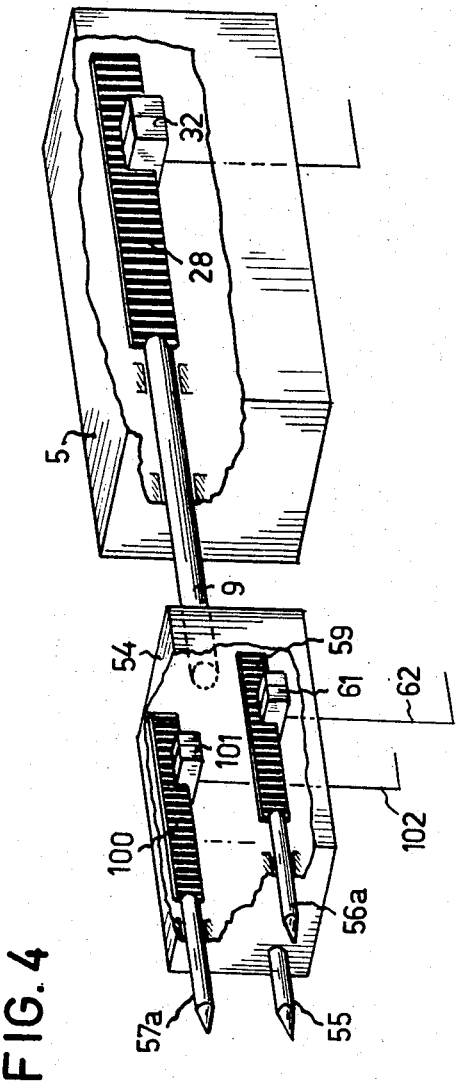
FIG. 4 is a schematic view of a measuring block with a measuring head according to the present invention.
Figure 5:
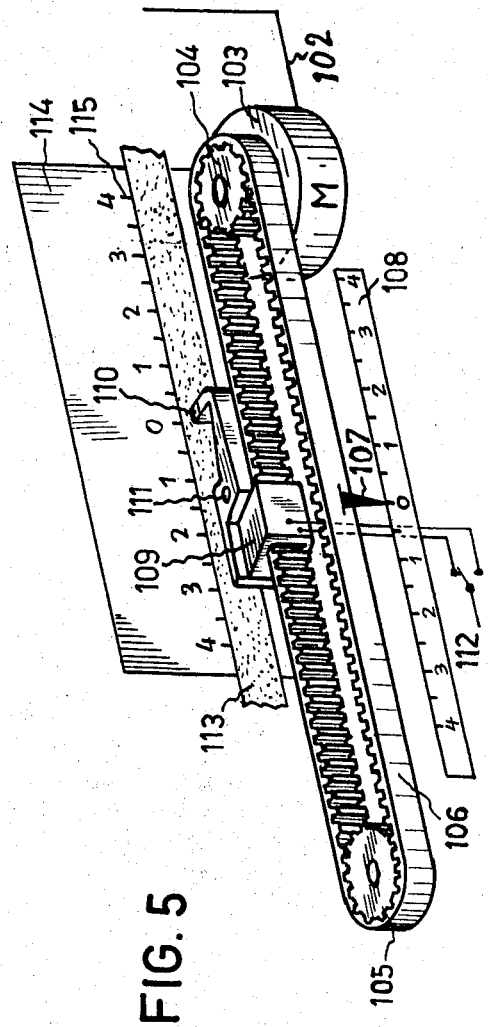
FIG. 5 is a schematic view of an indicating device with a unit for printing check charts according to the present invention.

FIGS. 4 and 5 illustrate the measurement of the camber on a vehicle wheel. The measuring head 54 includes the displaceable pin 57a carrying the notch unit 100. As the pin moves, the notch unit produces impulses in a photoelectric cell 101, said impulses being transmitted through conductor 102 to a stepping motor 103. The stepping motor transmits its movement to a rack 106 which is in engagement with the driving wheels 104, 105 and which moves a pointer 107 over the scale 108. The arrangement for the other vehicle wheels functions in the same manner so that the camber values for the four vehicle wheels may be read out simultaneously.

FIG. 5 shows a printing device which permits printing the measured value onto a check chart. The printing device consists of an electrical magnet 109 having an armature 110 movable around the axis 111. The electrical magnet is fixed on the rear side of rack 106 in such a manner that the armature passes a colored ribbon 113. On the rear side of the colored ribbon there is the check chart 114 having the scale 115 printed thereon. If the circuit of the electrical magnet 109 is closed by means of switch 112, the armature 110 abuts against the check chart 114 and enters the measured value as a point in scale 115.

Since photoelectric cells and stepping motors of known construction may be used with this invention, details of same have not been included so as to more clearly describe the invention.

While I have shown and described only several embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. Apparatus for measuring the angle of wheel inclination of vehicle wheels comprising:
    measuring means for obtaining a measurement of the angle of wheel inclination of each vehicle wheel with respect to a base axis of said apparatus,
    correlating means for determining a correction factor corresponding to the relative inclination with respect to said base axis of a predetermined vehicle base axis, and
    correcting means for correcting the measurement obtained by said measuring means in accordance with the correction factor determined by said correlating means so as to provide a measurement of wheel inclination with respect to the vehicle base axis, whereby it is unnecessary to align the vehicle in relation to a base axis of the apparatus.

2. Apparatus as set forth in claim 1, wherein said measuring means comprises a two-dimensional scanning device provided for each vehicle wheel for application along a path to the wheel plane of each wheel.

3. Apparatus as set forth in claim 2, wherein a counting and indicating means is provided for counting and indicating each measurement provided by said measuring means.

4. Apparatus as set forth in claim 2, wherein the measuring means are incremental measuring means for measuring the paths of application of the scanning devices and the angles of inclination of the vehicle wheels by an incremental method.

5. Apparatus as set forth in claim 3, wherein the measuring means further comprise measuring blocks having measuring heads with feeler pins which blocks and heads are electrically connected through electric conductors to the counting and indicating means.

6. Apparatus as set forth in claim 5, wherein the measuring heads are secured to push rods of the measuring blocks and carry feeler pins arranged with a first pin being stationary, a second pin being arranged horizontally thereof, and a third movable pin arranged in vertical relationship to said first pin.

7. Apparatus as set forth in claim 1, wherein measuring discs are provided which discs are secured to the vehicle wheels in exact adjustment to the geometrical wheel plane.

8. Apparatus as set forth in claim 6, wherein the movable feeler pins, respectively, are connected each with an incremental notch unit means for providing countable impulses.

9. Apparatus as set forth in claim 8, wherein stepping motor means are provided for counting and storing the impulses.

10. Apparatus as set forth in claim 9, wherein differential gear means are provided for summing up the movements of the stepping motor means.

11. Apparatus as set forth in claim 1, wherein the vehicle has front and rear wheels and the correlating means comprises pairs of cooperating measuring blocks provided, respectively, one pair for the vehicle front and one pair for the vehicle rear, with push rods connected to said blocks, said rods respectively carrying incremental notch units, photoelectric cell means for counting said notch units which cells transmit impulses through conductors to stepping motors, and differential gear means provided for each stepping motor for receiving the transferred movement of each of said stepping motors.

12. Apparatus as set forth in claim 1, wherein measuring heads are provided for measuring the angular inclination of the vehicle wheels, said measuring heads having feeler pin means for application to the wheel plane of each wheel, incremental notch units are connected with the feeler pin means for producing impulses in photoelectric cells, and stepping motor means for operating in response to said impulses are provided.

13. Apparatus as set forth in claim 1, wherein the measuring means measure the toe-in of the vehicle wheels, stepping motor means are provided for receiving said correction factor, and differential gear means are provided for summing up the correction factors of said stepping motor means.

14. Apparatus as set forth in claim 1, wherein the measuring means measure the camber of the vehicle wheels and stepping motor means are provided for directly indicating the camber value.

15. Apparatus as set forth in claim 1, wherein racks are provided for receiving the measurements of the angular inclinations of the vehicle wheels, said racks having scales and pointers so that said measurements can be read from said scales.

16. Apparatus as set forth in claim 15, wherein a printing means is connected with each of the racks for transferring the measurements onto a check chart.

17. Apparatus for measuring vehicle chassis geometry, especially for measuring the angle of wheel inclination of vehicle wheels of the type having at least two pairs of vehicle wheels sapced longitudinally from one another with the wheel plane of each wheel of a pair being spaced equidistantly from a longitudinal vehicle centerline; said apparatus comprising:
  a measuring place for accepting a vehicle, said measuring place having a longitudinally extending fixed centerline,
  wheel plane measuring means provided at said measuring place for determining the distance between the wheel plane of each individual wheel from said fixed centerline, said wheel plane measuring means including means supplying an output signal corresponding to each of the distances determined,
  wheel inclination measuring means provided at said measuring plane for determing the angular orientation of each individual wheel of at least one pair of the vehicle wheels with respect to said fixed centerline, said wheel inclination measuring means including means supplying an output signal corresponding to each of the angular orientations determined, and
  vehicle angular orientation compensating means for utilizing said output signals of said wheel plane measuring means to automatically modify said output signals of said wheel inclination means so as to compensate for any difference in angular orientation of said fixed centerline and said vehicle centerline and thereby relate the angular orientation of each wheel to the longitudinal vehicle centerline, whereby alignment of the vehicle centerline with respect to the fixed centerline is unnecessary for obtaining an indication of the wheel inclination with respect to the vehicle centerline.

18. Apparatus according to claim 17, wherein said wheel inclination measuring means includes means for determining the angular orientation of all of the vehicle wheels.

19. Apparatus according to claim 17, wherein a fixed measuring station is positioned at said measuring place for each wheel of the vehicle to be measured, wherein each of said wheel plane measuring means includes a movable first plunger mounted in one of said measuring stations, wherein wheel engaging means are mounted at one end of each of said first plungers and wherein digital counting means are mounted at each of said fixed stations for detecting movement of said respective first plungers and for supplying output signals corresponding to said movement.

20. Apparatus according to claim 19, wherein each of said wheel inclination measuring means includes a movable second plunger mounted adjacent the wheel engaging end of one of said respective first plungers, said second plungers being directly engageable with a wheel at a position spaced from the engagement of the first plunger, and wherein digital counting means are mounted at said first plungers for detecting relative movement of respective ones of said first plungers and second plungers and for supplying output signals corresponding to said movement.

21. Apparatus according to claim 20, wherein the output signals of the digital counting means of said wheel plane measuring means are supplied to stepping motors operatively arranged to adjust a readout mechanism which is operated by output signals from the digital counting means of said wheel inclination measuring means to further stepping motors.

22. Apparatus according to claim 21, wherein said wheel inclination measuring means includes means for determining the angular orientation of all of the vehicle wheels.

23. Apparatus according to claim 21, wherein said digital counting means include photoelectric cells for detecting movement of notches in said plungers.

24. A method for measuring the angle of inclination of the wheels of a vehicle located in a measuring installation comprising:
  measuring the angle of inclination of each wheel with respect to a reference axis of the measuring installation, measuring the relative inclination of a predetermined vehicle base axis with respect to the reference axis of the measuring installation, correcting the measured angle of inclination of each wheel in accordance with the measured relative inclination of the vehicle base axis so as to provide a measurement of angle of inclination of each wheel with respect to the vehicle base axis.

* * * * *